United States Patent [19]

Kassai

[11] Patent Number: 4,560,022

[45] Date of Patent: Dec. 24, 1985

[54] ELECTRICALLY DRIVEN CHILDREN'S VEHICLE

[75] Inventor: Kenzou Kassai, Osaka, Japan

[73] Assignee: Kassai Kabushikikaisha, Osaka, Japan

[21] Appl. No.: 630,220

[22] Filed: Jul. 12, 1984

[30] Foreign Application Priority Data

Jul. 22, 1983 [JP] Japan .............................. 58-114726[U]

[51] Int. Cl.$^4$ ........................ B60K 1/00; B60K 17/00; B62D 11/00
[52] U.S. Cl. ................................ 180/65.1; 180/6.66; 180/65.6; 180/336
[58] Field of Search ...................... 180/6.5, 6.66, 65.1, 180/65.6, 336

[56] References Cited

U.S. PATENT DOCUMENTS

| | | | |
|---|---|---|---|
| 1,590,676 | 6/1926 | Doncaster | 180/6.66 |
| 1,830,310 | 11/1931 | Apple | 180/65.1 |
| 3,719,247 | 3/1973 | Hollis | 180/65.1 |

FOREIGN PATENT DOCUMENTS 2092969  8/1982  United Kingdom ............... 180/65.1

*Primary Examiner*—John J. Camby
*Attorney, Agent, or Firm*—W. G. Fasse; D. H. Kane, Jr.

[57] ABSTRACT

This electrically driven children's vehicle has a vehicle body 1 provided with front wheels 2, rear wheels 3, and a motor 8 for driving the rear wheels 3. The vehicle body 8 has a clutch lever 7 attached thereto, which clutch lever 7 is used to turn on and off the transmission of torque from the motor 8 to the rear wheels 3. A forward travel pedal 14 and a backward travel pedal 15 for rotating the rear wheels in the forward and backward direction, respectively, are mounted on the vehicle body 1 at a position where they can be operated by the foot, and these pedals are positioned relative to each other so that the forward travel pedal is disposed forwardly of the backward travel pedal. Further, the vehicle body 1 is provided with a motor drive circuit 20 adapted to rotate the motor 8 in the forward or backward direction when the forward travel pedal 14 or backward travel pedal 15 is pressed and to stop the rotation of the motor 8 when both the forward and backward travel pedals 14 and 15 are pressed at the same time.

4 Claims, 9 Drawing Figures

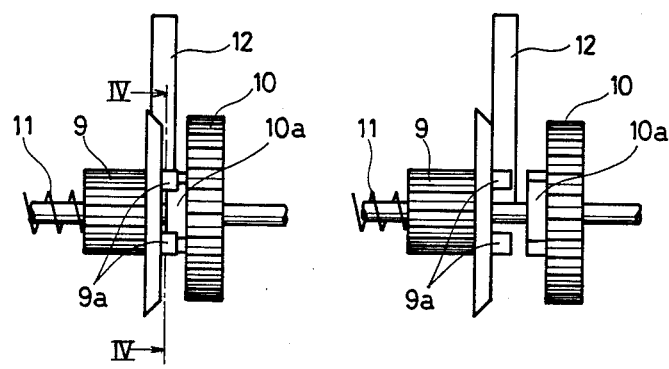
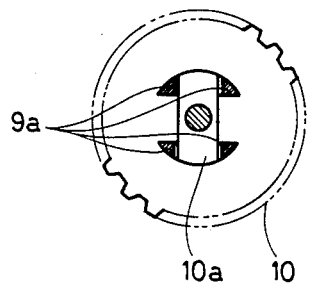
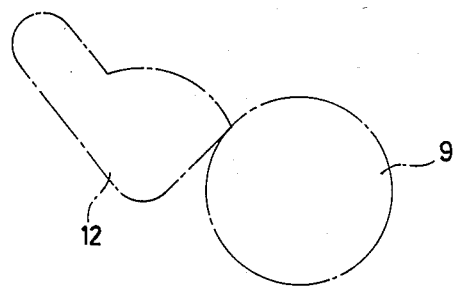
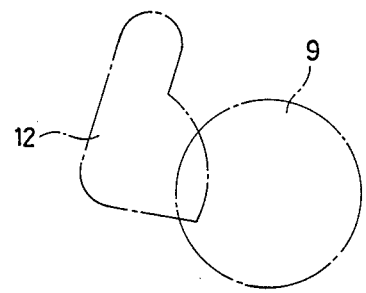

ELECTRICALLY DRIVEN CHILDREN'S VEHICLE

BACKGROUND OF THE INVENTION

1. Field of the Invention

This invention relates to an electrically driven children's vehicle and more particularly it relates to an electrically driven children's vehicle having an external shape looking like that of an automobile or motorbicycle.

2. Description of the Prior Art

There have been children's vehicles of various forms and constructions. One such children's vehicle has been in wide use which has an external shape similar to that of an automobile or motorbicycle and is constructed so that a child while sitting on a seat and gripping with the hands a steering wheel can kick the ground with the feet to propel the vehicle for amusement. In recent years, electrically driven children's vehicles have been developed, constructed to drive the wheels for rotation by a motor for moving the vehicle forward and backward, enabling the child to amuse itself by driving the vehicle as if it were an automobile or a motorbicycle. Electrically driven children's vehicles of this kind, as far as I know, are generally of the type having a manually operable travel lever, when manipulated by hand, effects a switch among such travel modes as forward travel, backward travel, and neutral. Though externally resembling a real automobile or motorbicycle, such prior art toys are not constructed for imparting to a child the feeling of driving a real automobile or motorbicycle.

SUMMARY OF THE INVENTION

According to the invention, there is provided an electrically driven children's vehicle comprising a vehicle body having front wheels, rear wheels, a steering wheel for steering said front wheels, and a seat formed on the top, a motor mounted on said vehicle body for rotatively driving said front or rear wheels, a clutch lever for turning on and off the transmission of torque from said motor to said front or rear wheels, a forward travel pedal operable to rotate the front or rear wheels in the forward direction, a backward travel pedal operable to rotate the front or rear wheels in the back direction, said forward and backward travel pedals being attached to the vehicle body and positioned relative to each other so that the forward travel pedal is located forwardly of the backward travel pedal at a place where they can be operated by the foot, and a motor drive circuit constructed so that, depending on the depression of the forward or backward travel pedal by the foot, the motor is rotatively driven in the forward or backward direction and so that the motor is stopped if both pedals are simultaneously pressed down the motor is stopped.

The aforesaid motor drive circuit comprises forward and backward travel changeover switches having their common terminals connected to one end and the other end of said motor and having their normally closed terminals connected together and their normally open terminals connected together and a power source connected between the normally closed terminals and the normally open terminals of said changeover switches. The arrangement is such that said forward and backward travel changeover switches will be switched to the normally close terminals when the forward and backward travel pedals are not depressed, and to the normally open terminals when the forward and backward travel pedals are depressed.

An object of this invention is to provide an electrically driven children's vehicle which is capable of being driven in the manner of a real automobile or motorbicycle by using the hands and feet and which provides safety in that it can be reliably stopped if the forward and backward travel pedals are simultaneously pressed.

Another object of this invention is to provide an electrically driven children's vehicle which is arranged to be driven forwardly and backwardly when forward and backward travel pedals, relatively disposed in forward and backward positions, are depressed, respectively, thereby enabling children to develope their sense of direction.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are side views showing the engaged and disengaged states of the clutch mechanism shown in FIG. 2;

FIG. 4 is a sectional view taken along the line IV—IV of FIG. 3A;

FIGS. 5A and 5B are views for explaining the movement of a clutch plate in the clutch mechanism shown in FIGS. 3A to 4, FIG. 5A shows the state corresponding to that shown in FIG. 3A, i.e., the engaged state and FIG. 5B shows the state corresponding to that shown in FIG. 3B, i.e., the disengaged state;

DESCRIPTION OF THE PREFERRED EMBODIMENT AND OF THE BEST MODE OF THE INVENTION

Figure 1:
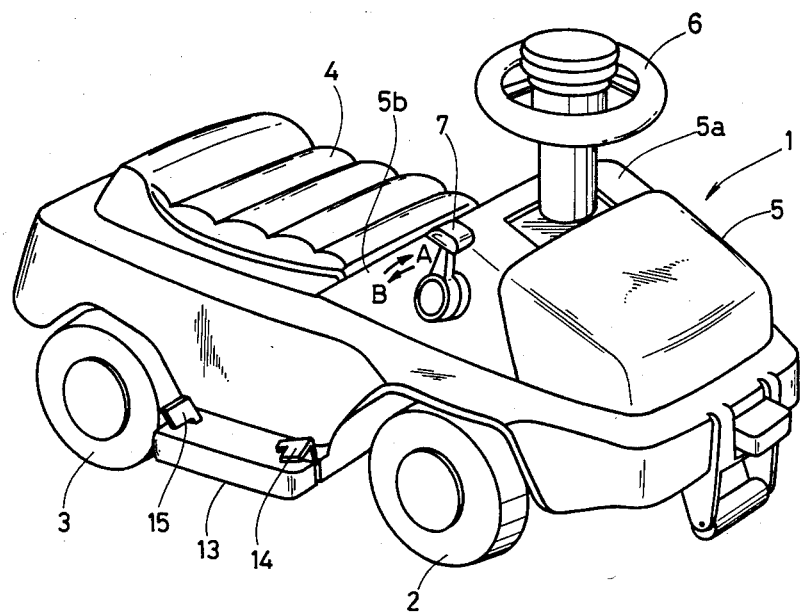
FIG. 1 is a perspective view of an electrically driven children's vehicle according to an embodiment of this invention.

Referring to FIG. 1, a vehicle body 1 is constructed so that its outer shape is similar to that of an automobile or motorbicycle. Installed in the front and rear regions of this vehicle body 1 are two front wheels 2 and two rear wheels 3, respectively. Further, there are a seat 4 on the top of the vehicle body 1 and a bumper 5 positioned above the level of the seat 4. A steering wheel 6 for steering the front wheels 2 is attached to the middle of a vehicle portion 5a between the seat 4 and bumper 5 on the vehicle body 1. A clutch lever 7 is attached to the side wall 5b of the vehicle portion 5a so that it can be turned in the directions of arrows A and B in FIG. 1.

Though not shown in FIG. 1, a motor serving as a drive source is mounted in the vehicle body 1. The shaft of the motor 8 is connected to a gear 10 of a clutch mechanism through a gear not shown, while the gear 9 is connected to the rear wheels 3 through a further gear not shown. The gears 9 and 10 of the clutch mechanism, as is clear from FIG. 3A which is a side view showing the disengaged state, are disposed in opposed relation to each other. Further, as is clear from the sectional view taken along the line VI—VI of FIG. 3, one gear 9 is formed with four projections 9a, while the other gear 10 is formed with a projection 10a. The gear 9 is urged toward the gear 10 by a spring member 11. Thus, the projection 10a on the gear 10 enters between the four projections 9a on the gear 9 under the urging force of the spring member 11, whereby the two gears 8 and 10 are engaged with each other so as to transmit the torque of the motor 8 to the rear wheels 3.

Figure 2:
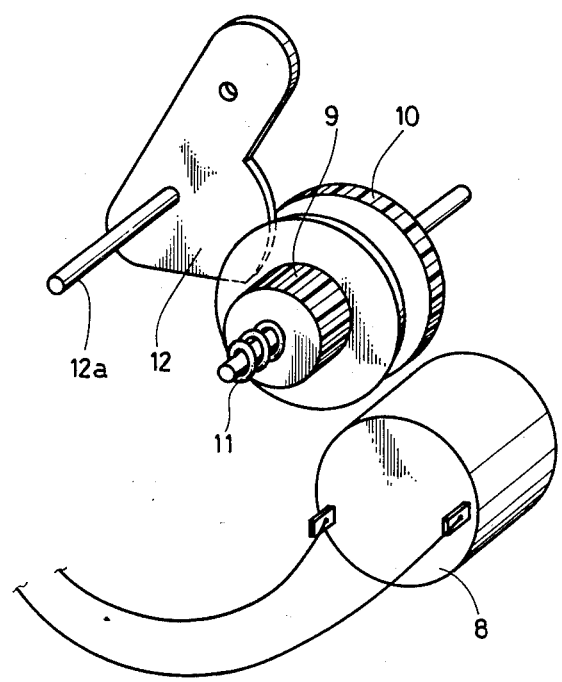
FIG. 2 is a perspective view showing the relation between a motor and a clutch mechanism mounted on the embodiment shown in FIG. 1.

Further, as shown in FIG. 2, a clutch plate 12 is rotatably mounted on a shaft 12a. The clutch plate 12 can enter between the gears 9 and 10 of the clutch mechanism. When the clutch mechanism is in the engaged state, i.e., in the state shown in FIG. 3A, the clutch plate 12 is positioned outside the gear 9, as schematically shown in FIG. 5A. When the clutch plate 12 is turned to enter between the gears 9 and 10, as schematically shown in FIG. 5B, the clutch plate 12 moves the gear 9 away from the gear 10 against the force of the spring member 11, as shown in FIG. 3B. Thus, as shown in FIG. 3A, the clutch mechanism assumes the disengaged state.

Figure 7:
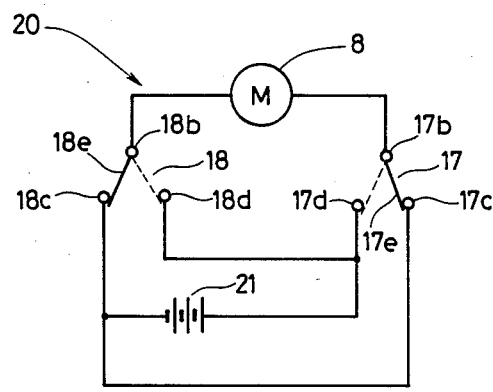
FIG. 7 is a circuit diagram of a motor drive circuit used in the embodiment shown in FIG. 1.

The clutch plate 12 is connected to the clutch lever 7 shown in FIG. 7 through a link (not shown). The linkage is such that when the clutch lever 7 shown in FIG. 1 is turned forwardly in the direction of arrow A in FIG. 1, the clutch mechanism is brought into the disengaged or neutral state shown in FIGS. 3B and 5B, but when it is turned rearwardly in the direction of arrow B in FIG. 1, the clutch mechanism is brought into the engaged state shown in FIGS. 3A and 5B.

Figure 6:
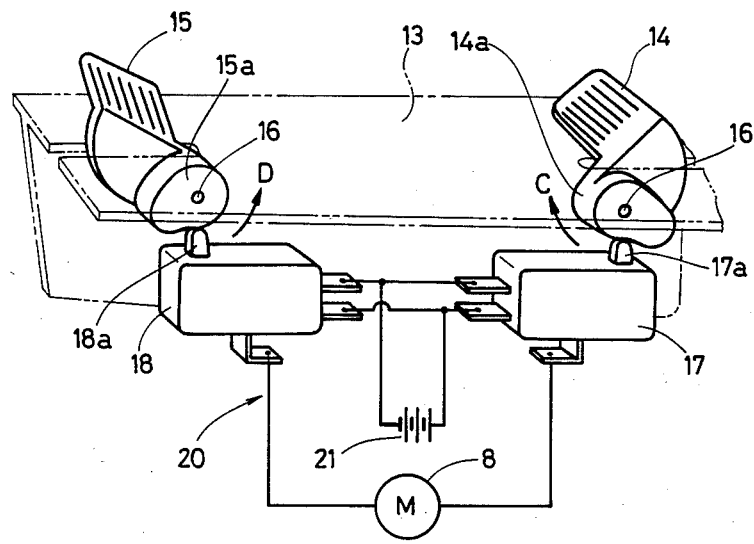
FIG. 6 is a view showing the relationship between the forward and backward travel pedals and the motor in the embodiment shown in FIG. 1.

Turning back to FIG. 1, the opposite sides of the middle of the vehicle body 1 are formed with steps 13 for receiving the feet. A forward travel pedal 14 and a backward travel pedal 15 are attached to the front and rear regions of the step 13. The relation between the forward and backward travel pedals 14, 15 and the motor 8 will be described with reference to FIG. 6. As is clear from FIG. 6, the forward and backward travel pedals 14 and 15 are turnably attached to the step 13 by respective pins 16. The pedals 14 and 15 are integrally formed with cams 14a and 15a adjacent the respective pins 16 around which they are turned. The cams 14a and 15a are in contact with the changeover levers 17a and 18a of forward and backward travel changeover switches 17 and 18 for changing the direction of rotation of the motor 8. In addition, the two pedals 14 and 15 are upwardly urged at all times by springs (not shown). Therefore, when the pedals 14, 15 are not pressed by the foot, the changeover switches 17a and 18a of the forward and backward travel changeover switches 17 and 18 are in the off-state as shown in FIG. 7.

A motor drive circuit 20 as shown in FIG. 7 is attached to the vehicle body 1 shown in FIG. 1. As is clear from FIG. 7, the common terminals 17b and 18b of the forward and backward travel changeover switches 17 and 18 are connected to the opposite ends of the motor 8. Further, the normally closed terminals 17c and 18c of the changeover switches 17 and 18 are connected together and the normally open terminals 17d and 18d are connected together. A power source 21 is connected between the normally closed terminals 17c, 18c and the normally open terminals 17d, 18d.

The contacts 17e and 18e of the forward and backward travel changeover switches 17 and 18 are adapted to be actuated in operative connection with the changeover levers 17a and 18a of the switches, respectively. That is, when the forward travel pedal 14 is kept depressed, the contact 17e is connected to the normally open terminal 17d, so that the motor 8 is rotatively driven in the forward direction. On the other hand, when the backward travel pedal 15 is kept depressed, the contact 18e is connected to the normally open terminal 18d, so that the motor 8 is rotated in the backward direction. Further, when neither of the pedals 14 and 15 is depressed, the terminals 17e and 18e are connected to the normally closed terminals 17a and 18c, so that the motor 8 is not energized. Similarly, when both of the pedals 14 and 15 are depressed, the terminals 17e and 18e are connected to the normal open terminals 17d and 18d, so that the motor 8 does not rotate.

The way of operating the embodiment described so far with reference to FIGS. 1 to 7 will now be explained.

As described above, before the electrically driven children's vehicle of this embodiment is operated, that is, when neither of the forward and backward travel pedals 14 and 15 is depressed, the contacts 17e and 183 of the forward and backward travel changeover switches 17 and 18 are connected to the normally closed terminals 17c and 18c. Thus, the motor 8 is not energized and hence it does not rotate.

When it is desired to operated this vehicle, the child sits on the seat 4 with his hands gripping the steering wheel 6, and when he wants to move the vehicle in the forward direction, he tilts the clutch lever 7 forwardly, i.e., in the direction A in FIG. 1 to once establish the neutral state. Subsequently he presses the forward travel pedal 14 by his foot to rotate the motor 8 and, with this forward travel pedal 14 kept depressed, tilts the clutch lever 7 backwardly, whereby the rear wheels 3 are forwardly rotated to move the vehicle forwardly. As another way of operation, first the clutch lever 7 may be tilted backwardly, i.e., in the direction of arrow B, see FIG. 1 and then, in this condition, the forward travel pedal 14 is depressed.

The respective movements of the components based on said two ways of operation will be described in more detail. In the former way of operation, when the clutch lever 7 is forwardly tilted, the clutch plate 12 is turned downwardly through the link, thus disengaging the gears 9 and 10 from each other as shown in FIGS. 3B and 5B and bringing the clutch mechanism into the neutral state. Since the forward travel pedal 14 is depressed in this state, the cam 14a of said pedal 14 is turned in the direction C in FIG. 6, thereby tilting the contact 17e of the forward travel changeover switch 17 to the normally open terminal 17d, with an electric current flowing in the path extending from the power source 21 successively through the forward travel changeover switch 17, motor 8, and backward travel changeover switch 18 and back to the power source 21, so that the motor 8 is rotated in the forward direction.

Subsequently, with the forward travel pedal 14 kept depressed, the clutch lever 7 is tilted backwardly, i.e., in the direction B in FIG. 1, whereupon the clutch plate 12 is upwardly turned through the link. Therefore, as shown in FIGS. 3A and 5A, the clutch plate 12 is disengaged from between the gears 9 and 10 of the clutch mechanism, allowing the gears 9 and 10 to engage each other under the force of the spring member 11, with the result that the clutch mechanism is engaged. Consequently, the forward rotation of the motor 8 is transmitted to the rear wheels 3 and hence the children's vehicle of this embodiment travels forwardly.

On the other hand, in the latter way of operation, since the clutch lever 7 is in the backwardly titled position, the gears 9 and 10 have already been engaged with each other and hence the clutch mechanism has been engaged. Therefore, if the forward travel pedal 14 is depressed in this state, an electric current flows through the motor 8 in the same path of current as described above, so that the motor 8 is rotated in the forward direction. Thus, the torque of this motor 8 is transmitted to the rear wheels 3 to move the children's vehicle in the forward direction.

In addition, for backward travel, this can be attained by depressing the backward travel pedal 15 instead of the forward travel pedal 14 in the aforesaid way of operation for forward travel.

The movements of the components that occur in the backward travel are almost the same as in the forward travel, but the motor 8 is rotated in the backward direction. That is, when the backward travel pedal 15 is depressed, the cam 15a of said pedal 15 is rotated in the direction of arrow D in FIG. 6, whereby the contact 18e of the backward travel changeover switch 18 is tilted to the normal open terminal 18d, allowing an electric current to flow through the path extending from the power source 21 successively through the backward travel changeover switch 18, motor 8, and forward travel changeover switch 17 and back to the power source 21, so that the motor 8 is rotated in the backward direction. Thus, the rear wheels 3 to which the backward torque of the motor 8 is transmitted are rotated in the backward direction to drive the children's vehicle backwardly.

When it is desired to stop the children's vehicle of this embodiment, this can be attained by tilting the clutch lever 7 forwardly or by removing the foot from the pedal 14 or 15. When the clutch lever 7 is forwardly tilted, the torque of the motor 8 ceases to be transmitted to the rear wheels 3 and hence the vehicle is stopped. If the foot is removed from the pedal 14 or 15, the pedal returns upwardly, tilting the contact 17e or 18e of the changeover switch 17 or 18 to the normal close contact 17c or 18c, so that the rotation of the motor 8 is stopped and hence the vehicle ceases to travel.

As described above, since the embodiment shown in FIGS. 1 to 7 is constructed to be operable using the hands and feet, it can be operated as if it were a real automobile; thus it will be understood that the vehicle is very interesting to children. Further, the forward and backward travel pedals 14 and 15 are positioned separately in the front and rear regions of the step 13 so that if the forwardly positioned pedal 14 is pressed the vehicle travels forward and if the backwardly positioned pedal 15 is pressed the vehicle travels backward; thus it will be understood that the vehicle contributes toward developing children's sense of direction.

Further, if the two pedals 14 and 15 are simultaneously depressed by mistake during operation, the contacts 17e and 18e of the forward and backward travel changeover switches 17 and 18 are tilted to the normally open terminals 17d and 18d, establishing the connection shown in broken lines in FIG. 7 to cut off the power supply to the motor 8. Therefore, the rotation of the motor 8 is stopped and so is the vehicle. Thus, it is seen that the vehicle provides safety in that it stops its automatic traveling if the two pedals are simultaneously depressed by mistake.

In addition in the embodiment described so far with reference to FIGS. 1 to 7, although the forward and backward travel pedals 14 and 15 have been provided on one step 13, they may be provided on both steps 13. Further, the place at which the forward and backward travel pedals are provided is not limited to the step or steps 13, and instead they may be provided at any place so far as they can be operated by a child using his feet.

Further, in the embodiment shown in FIGS. 1 to 7, the rear wheels 3 have been driven by the motor 8, but the arrangement may be such that the front wheels are driven by the motor.

Further, in the embodiment shown in FIGS. 1 to 7, the outer shape of the vehicle body 1 has been made to resemble that of an automobile, but it may be made to resemble the outer shape of some other vehicle, such as a motorbicycle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrically driven children's vehicle comprising: a vehicle body having front wheels, rear wheels, a steering wheel for steering said front wheels, and a seat formed on top of said vehicle body, an electric motor mounted in said vehicle body for rotatively driving said front or rear wheels, said electric motor having respective power input terminals, a clutch lever attached to said vehicle body for turning on and off the transmission of torque from said motor to the front or rear wheels, a forward travel pedal means operable for rotating said front or rear wheels in the forward direction, a backward travel pedal means operable for rotating said front or rear wheels in the backward direction, said forward and backward travel pedal means being attached to the vehicle body and positioned relative to each other so that a forward travel pedal is located forwardly of a backward pedal at a place where said pedals can be operated by a foot, and a motor drive circuit including circuit switch means responsive to said forward and backward pedal means so that when said forward or backward travel pedal means is depressed, said motor rotates forwardly or backwardly, respectively, and so that said motor is stopped when the two pedals are simultaneously depressed, said circuit switch means comprising forward and backward travel changeover switches having common terminals connected to said electric power terminals of said electric motor, said changeover switches having normally closed contact means connected together, and normally open contact means also connected together, an electric power source connected between said normally closed contact means and said normally open contact means of said two changeover switches, and means operatively arranged between said forward and backward travel pedal means and the respective one of said contact means for keeping said normally closed contact means closed when said forward or backward travel pedal is not depressed, and for changing one of said contact means from a normally closed state to the normally open state when one of said pedals is depressed for supplying power to said electric motor from said electric power source.

2. The electrically driven children's vehicle of claim 1, wherein said vehicle body has right and left sides, said vehicle body having a stepping board on each of said sides, said stepping boards serving as footrests, and wherein said forward and backward travel pedals are attached to at least one of said stepping boards.

3. The electrically driven children's vehicle of claim 1, further comprising a clutch mechanism connected between said front and rear wheels driven by said motor, said clutch mechanism being operable by said clutch lever for engaging and disengaging said wheels from said drive motor.

4. The electrically driven children's vehicle of claim 1, wherein each of said forward and backward travel pedals is provided with a cam (14a, 15a) arranged for operating the respective contact means of the respective forward and backward travel changeover switch when one of said pedals is depressed.

* * * * *